United States Patent
Tong et al.

(10) Patent No.: US 8,659,281 B2
(45) Date of Patent: Feb. 25, 2014

(54) BUCK CONVERTER

(75) Inventors: Song-Lin Tong, Shenzhen (CN); Qi-Yan Luo, Shenzhen (CN); Peng Chen, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

(*) Notice: Subject to any disclaimer, the term of this patent is extended or adjusted under 35 U.S.C. 154(b) by 469 days.

(21) Appl. No.: 13/093,209

(22) Filed: Apr. 25, 2011

(65) Prior Publication Data

US 2012/0169314 A1 Jul. 5, 2012

(30) Foreign Application Priority Data

Dec. 29, 2010 (CN) .......................... 2010 1 0611411

(51) Int. Cl.
*H02M 3/156* (2006.01)

(52) U.S. Cl.
USPC .......................................... 323/285; 323/351

(58) Field of Classification Search
USPC .......................................... 323/282–285, 351
See application file for complete search history.

(56) References Cited

U.S. PATENT DOCUMENTS

| | | | | |
|---|---|---|---|---|
| 6,229,292 B1* | 5/2001 | Redl et al. | ...................... | 323/285 |
| 7,268,527 B2* | 9/2007 | Horner | ......................... | 323/285 |
| 7,298,261 B2* | 11/2007 | Fujimori et al. | .............. | 340/551 |
| 7,368,899 B2* | 5/2008 | Chi | ................. | 323/285 |
| 7,586,767 B1* | 9/2009 | Prodic et al. | ..................... | 363/65 |
| 7,667,986 B2* | 2/2010 | Artusi et al. | ..................... | 363/16 |
| 8,098,056 B2* | 1/2012 | Yamazaki et al. | ............. | 323/222 |
| 8,410,764 B2* | 4/2013 | Scaldaferri et al. | ........... | 323/282 |

* cited by examiner

*Primary Examiner* — Jessica Han
(74) *Attorney, Agent, or Firm* — Altis Law Group, Inc.

(57) ABSTRACT

A buck converter includes a first MOSFET and a second MOSFET connected in series, a PWM module coupled to gates of the first MOSFET and the second MOSFET, and a control unit being coupled to the input current acquired unit, the input voltage acquired unit, the output current acquired unit, the output voltage acquired unit and the PWM module respectively, wherein the control unit controls a switch frequency of the PWM module and acquires the input current, the input voltage, the output current and the output voltage from the input current acquired unit, the input voltage acquired unit, the output current acquired unit and the output voltage acquired unit respectively.

9 Claims, 2 Drawing Sheets

BUCK CONVERTER

BACKGROUND

1. Technical Field

The present disclosure relates to a buck converter, and especially relates to a buck converter for a main board of a computer.

2. Description of Related Art

In computer systems, buck converters are frequently used in power sources for main boards. In order to obtain a good power utility efficiency, a switch frequency of the buck converter must be adapted to loads in the computer system. How to determine an optimal switch frequency of the buck converter becomes a problem.

What is needed therefore is a buck converter which can overcome the above limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
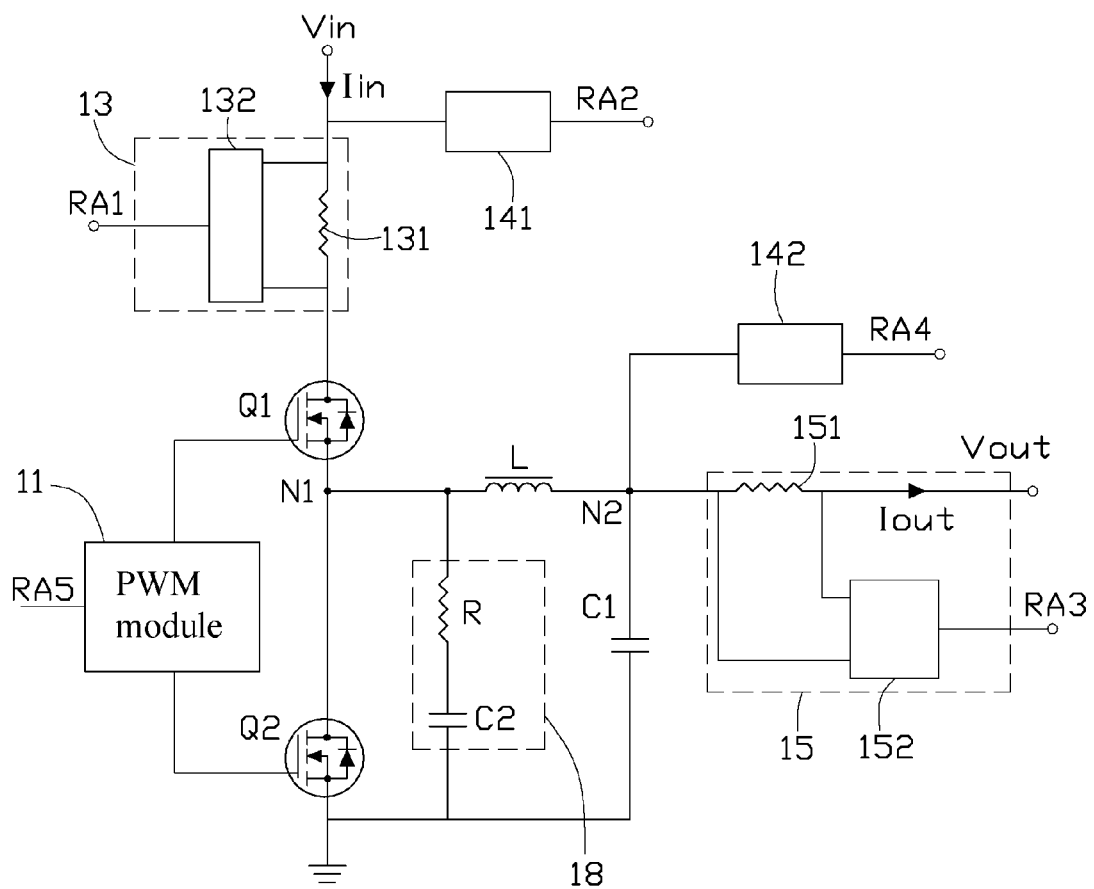
FIG. 1 is a schematic, block diagram of a buck converter in accordance with an embodiment of the present disclosure.
Figure 2:
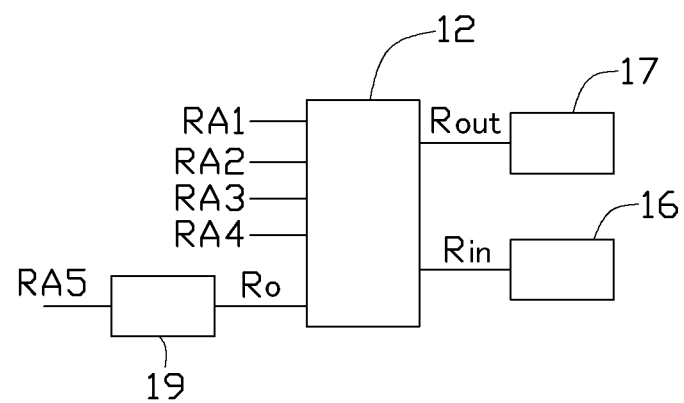
FIG. 2 is a schematic, block diagram of a control unit connected to elements in FIG. 1.

As shown in FIG. 1 and FIG. 2, a buck converter in accordance with an embodiment of the present disclosure includes an input node Vin, a first pulse width modulation (PWM) module 11, a first metal oxide semiconductor field effect transistor (MOSFET) Q1, a second MOSFET Q2, a control unit 12, an input current acquired unit 13, an input voltage acquired unit 141, an output voltage acquired unit 142, an output current acquired unit 15, an input unit 16, a display unit 17, a buffer unit 18, a voltage adjusting unit 19 and a output node Vout. The input node Vin is adapted to connect to a power source, to received power for the buck converter.

The PWM module 11 is coupled to a gate of the first MOSFET Q1 and a gate of the second MOSFET Q2 respectively. The PWM module 11 provides gate drive signals to the gates of the first MOSFET Q1 and second MOSFET Q2 alternatively. That is, the PWM module 11 turns on the first MOSFET Q1 while turning off the second MOSFET Q2 during a first portion of each PWM cycle, and then turns on the second MOSFET Q2 while turning off the first MOSFET Q1 during a second portion of each PWM cycle.

A drain of the first MOSFET Q1 is coupled to the input node Vin through the input current acquired unit 13, and a source of the first MOSFET Q1 is coupled to a first intermediate node N1. A drain of the second MOSFET Q2 is coupled to the first intermediate node N1 and a source of the second MOSFET Q2 is coupled to a reference node, such as ground. The inductor L is coupled between the first intermediate node N1 and a second intermediate node N2. The first capacitor C1 is coupled between the second intermediate node N2 and the ground. The inductor L and the first capacitor C1 are configured to output a direct current (DC) voltage in the second intermediate node N2.

The buffer unit 18 is in parallel connection with the second MOSFET Q2. The buffer unit 18 includes a resistor R and a second capacitor C2. The resistor R and the second capacitor C2 are in series connection. The resistor R is connected to the first intermediate node N1, and the second capacitor C2 is connected to the ground. The buffer unit 18 is configured to decrease a peak voltage between the drain and the source of the second MOSFET Q2.

The input current acquired unit 13 includes a first sampling resistor 131 and a first voltage acquired unit 132. The first sampling resistor 131 is coupled between the input node Vin and the drain of the first MOSFET Q1. The first voltage acquired unit 132 is coupled to the first sampling resistor 131 for acquiring a voltage U1 of the first sampling resistor 131. In this embodiment, the first sampling resistor 131 is manganese wire resistor. The input voltage acquired unit 141 is coupled to the input node Vin to obtain an input voltage Uin at the input node Vin.

The output voltage acquired unit 142 is coupled to the second intermediate node N2 to obtain an output voltage Uout. The output current acquired unit 15 is coupled between the second intermediate node N2 and an output node Vout. The output current acquired unit 15 includes a second sampling resistor 151 and a second voltage acquired unit 152. The second sampling resistor 151 is coupled between the second intermediate node N2 and the output node Vout. The second voltage acquired unit 152 is coupled to the second sampling resistor 151 for acquiring a voltage U2 of the second sampling resistor 151. In this embodiment, the second sampling resistor 151 is also manganese wire resistor.

The control unit 12 has four input ports RA1, RA2, RA3 and RA4. The input port RA1 is coupled to the first voltage acquired unit 132 to receive the voltage U1 of the first sampling resistor 131. The input port RA2 is coupled to the input voltage acquired unit 141 to receive the voltage Uin at the input node Vin. The input port RA3 is coupled to the second voltage acquired unit 152 to receive the voltage U2. The input port RA4 is coupled to the output voltage acquired unit 142 to receive the voltage Uout. Values of the resistance R1 of the first sampling resistor 131 and the resistance R2 of the second sampling resistor 151 are previously stored in the control unit 12. The input current Iin of the buck converter can be calculated as Iin=U1/R1 and the output current Iout of the buck converter can be calculated as Iout=U2/R2. Therefore, the power utility efficiency η of the buck converter can be calculated as η=(Uout*Iout)/(Uin* Iin).

The input unit 16 is coupled to an input port Rin of the control unit 12 to input a predetermined switch frequency to the PWM module 11. The display unit 17 is coupled to an output port Rout of the control unit 12 to display the switch frequency of the PWM module 11 and the corresponding power utility efficiency η of the buck converter. The voltage adjusting unit 19 is coupled between an output port Ro of the control unit 12 and an input port RA5 of the PWM module 11 to adjust the switch frequency of the PWM module 11 to the predetermined switch frequency.

In operation, users can input the predetermined switch frequency to the input unit 16 through a keyboard. The control unit 12 receives a signal from the input unit 16 corresponding to the predetermined switch frequency and produces a corresponding control signal to the voltage adjusting unit 19. The voltage adjusting unit 19 changes the output voltage at the input port RA5 to adjust the switch frequency of the PWM module 11 to the predetermined switch frequency. And then, the control unit 12 can receive the voltage U1 from the input port RA1, receive the voltage Uin from the input port RA2, receive the voltage U2 from the input port RA3 and receive the voltage Uout from the input port RA4. Therefore, the control unit 12 can calculate the power utility efficiency η of the buck converter. The predetermined switch frequency and the corresponding power utility efficiency η will be transmitted to the display unit 17 for users to observe. Trying different switch frequencies in the input unit 16 and getting different power utility efficiencies of the buck converter, a switch frequency with higher power utility efficiency can be chosen and an optimal power utility efficiency can be obtained.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A buck converter, comprising:
   an input node being coupled to a power source;
   a first MOSFET having a gate, a drain coupled to the input node, and a source coupled to an intermediate node;
   a second MOSFET having a gate, a drain coupled to the intermediate node, and a source coupled to a reference node;
   a PWM module being coupled to the gate of the first MOSFET and the gate of the second MOSFET respectively;
   an inductor and a first capacitor being in parallel connection with the second MOSFET, the inductor having a first terminal coupled to the intermediate node and a second terminal, the first capacitor having a first terminal coupled to the second terminal of the inductor and a second terminal coupled to the reference node;
   an input current acquired unit being coupled between the drain of the first MOSFET and the input node to obtain an input current Iin of the buck converter;
   an input voltage acquired unit being coupled to the input node to obtain an input voltage Uin of the buck converter;
   an output current acquired unit being coupled between the second terminal of the inductor and an output node to obtain an output current Iout of the buck converter;
   an output voltage acquired unit being coupled to the second terminal of the inductor to obtain an output voltage Uout of the buck converter; and
   a control unit being coupled to the input current acquired unit, the input voltage acquired unit, the output current acquired unit, the output voltage acquired unit and the PWM module respectively, wherein the control unit controls the switch frequency of the PWM module and acquires the corresponding input current Iin, the corresponding input voltage Uin, the corresponding output current Iout and the corresponding output voltage Uout;
   wherein the input current acquired unit comprises a first sampling resistor and a first voltage acquired unit, the first sampling resistor is coupled between the input node and the drain of the first MOSFET, the first voltage acquired unit is coupled to the first sampling resistor to acquire a voltage U1 from the first sampling resistor.

2. The buck converter of claim 1, further comprising a buffer unit being in parallel connection with the second MOSFET, the buffer unit comprising a resistor and a second capacitor, the resistor having a first terminal coupled to the drain of the second MOSFET and a second terminal, the second capacitor having a first terminal coupled to the second terminal of the second MOSFET and a second terminal coupled to the reference node.

3. The buck converter of claim 1, wherein a value R1 of the resistance of the first sampling resistor is stored in the control unit, the input current Iin of the buck converter can be calculated as Iin=U1/R1.

4. The buck converter of claim 3, wherein the output current unit comprises a second sampling resistor and a second voltage acquired unit, the second sampling resistor is coupled between the inductor and the output node, the second voltage acquired unit is coupled to the second sampling resistor to acquire a voltage U2 from the second sampling resistor.

5. The buck converter of claim 4, wherein a value of R2 of the resistance is stored in the control unit, the output current Iout of the buck converter can be calculated as Iout=U2/R2.

6. The buck converter of claim 5, wherein the power utility efficiency η of the buck converter can be calculated as η=(Uout*Iout)/(Uin*Iin).

7. The buck converter of claim 1, further comprising an input unit being coupled to the control unit to input a predetermined switch frequency to the PWM module.

8. The buck converter of claim 7, further comprising a display unit to display the switch frequency of the PWM module and the corresponding output frequency η.

9. The buck converter of claim 1, further comprising a voltage adjusting unit being coupled between the control unit and the PWM module, the voltage adjusting unit changing an output voltage thereof to adjust the switch frequency of the PWM module according to a control signal from the control unit.

* * * * *